(12) United States Patent
Marjanovic et al.

(10) Patent No.: US 10,720,619 B2
(45) Date of Patent: Jul. 21, 2020

(54) ARRAY FRAME MOUNTING INSERTS FOR SECURING BATTERY ASSEMBLIES

(71) Applicant: FORD GLOBAL TECHNOLOGIES, LLC, Dearborn, MI (US)

(72) Inventors: Mladen Marjanovic, Windsor (CA); Saravanan Paramasivam, South Lyon, MI (US); Kimberley L. C. King, Northville, MI (US); Rajaram Subramanian, Ann Arbor, MI (US); Francisco Fernandez-Galindo, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 207 days.

(21) Appl. No.: 15/784,459

(22) Filed: Oct. 16, 2017

(65) Prior Publication Data
US 2019/0115574 A1 Apr. 18, 2019

(51) Int. Cl.
*C01B 3/38* (2006.01)
*H01M 2/10* (2006.01)

(52) U.S. Cl.
CPC ....... *H01M 2/1083* (2013.01); *H01M 2/1077* (2013.01); *H01M 2220/20* (2013.01)

(58) Field of Classification Search
CPC .......... H01M 2220/20; H01M 2/1077; H01M 10/625; H01M 2/1083; H01M 10/0481; H01M 10/0468; H01M 8/248
See application file for complete search history.

(56) References Cited

U.S. PATENT DOCUMENTS

| | | | |
|---|---|---|---|
| 5,756,227 A * | 5/1998 | Suzuki | F28F 3/02 429/120 |
| 9,397,605 B2 | 7/2016 | Stapleton | |
| 9,508,966 B2 | 11/2016 | Gunna et al. | |
| 9,543,556 B2 | 1/2017 | Boddakayala et al. | |
| 9,636,984 B1 | 5/2017 | Baccouche et al. | |
| 2002/0179552 A1* | 12/2002 | Marraffa | H01M 2/1077 211/49.1 |
| 2005/0084748 A1* | 4/2005 | Miller | H01M 2/1077 429/99 |
| 2005/0260488 A1* | 11/2005 | Zhou | B60R 16/04 429/99 |
| 2010/0304203 A1* | 12/2010 | Buck | H01M 2/1072 429/120 |
| 2012/0107659 A1 | 5/2012 | Phlegm et al. | |
| 2012/0156537 A1* | 6/2012 | Meintschel | H01M 2/021 429/99 |
| 2013/0108902 A1 | 5/2013 | Kriustofek et al. | |
| 2013/0260611 A1* | 10/2013 | Ahn | H01M 2/1077 439/627 |
| 2014/0050966 A1* | 2/2014 | Merriman | H01M 2/1077 429/156 |

(Continued)

FOREIGN PATENT DOCUMENTS

EP 2624330 A1 8/2013

*Primary Examiner* — Imran Akram
(74) *Attorney, Agent, or Firm* — David B. Kelley; Carlson, Gaskey & Olds (57) ABSTRACT

A battery pack includes an array frame having a fastener housing, a mounting insert positioned within the fastener housing, and a column bolt extending through the mounting insert. The mounting insert may be secured to a battery pack enclosure structure using one or more fasteners.

13 Claims, 8 Drawing Sheets

(56) References Cited

U.S. PATENT DOCUMENTS

| | | | |
|---|---|---|---|
| 2014/0186674 A1* | 7/2014 | Goesmann | B60K 1/04 |
| | | | 429/96 |
| 2015/0280336 A1* | 10/2015 | Itou | H01M 2/30 |
| | | | 439/625 |
| 2015/0318520 A1* | 11/2015 | Watanabe | H01M 2/1077 |
| | | | 429/66 |
| 2016/0099490 A1* | 4/2016 | Larsson | H01M 2/1077 |
| | | | 429/120 |
| 2016/0218332 A1 | 7/2016 | Baek et al. | |
| 2016/0375750 A1* | 12/2016 | Hokazono | B60K 1/04 |
| | | | 180/68.5 |
| 2017/0117675 A1* | 4/2017 | Itou | H01R 13/42 |
| 2018/0005787 A1* | 1/2018 | Henck | H01M 2/34 |

* cited by examiner

ARRAY FRAME MOUNTING INSERTS FOR SECURING BATTERY ASSEMBLIES

TECHNICAL FIELD

This disclosure relates to battery packs for electrified vehicles. An exemplary battery pack includes an array frame for retaining at least one battery cell. A mounting insert is received within the array frame for securing the array frame to an enclosure structure of the battery pack.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy for powering these electrical loads. The battery cells are often packaged together in one or more assemblies using various support structures such as frames, fasteners, bolts, rods, spacers, rails, walls, plates, brackets, bindings, etc. Using these types of support structures can lead to dimensional variations within each cell stack, thus resulting in packaging challenges.

SUMMARY

A battery pack according to an exemplary aspect of the present disclosure includes, among other things, an array frame having a fastener housing, a mounting insert positioned within the fastener housing, and a column bolt extending through the mounting insert.

In a further non-limiting embodiment of the foregoing battery pack, a second array frame is connected to the array frame. The mounting insert is received within a second fastener housing of the second array frame.

In a further non-limiting embodiment of either of the foregoing battery packs, the mounting insert includes a sleeve and a bracket that extends from the sleeve.

In a further non-limiting embodiment of any of the foregoing battery packs, the column bolt extends through a bore of the sleeve of the mounting insert.

In a further non-limiting embodiment of any of the foregoing battery packs, the bracket extends through a slot formed in the fastener housing.

In a further non-limiting embodiment of any of the foregoing battery packs, the bracket is a substantially flat flange that protrudes laterally away from an outer surface of the sleeve.

In a further non-limiting embodiment of any of the foregoing battery packs, the bracket includes a first section that extends in a first direction from the sleeve, a second section that extends in a second direction from the first section, and a third section that extends in a third direction from the second section.

In a further non-limiting embodiment of any of the foregoing battery packs, an axis through the first section, the second section, and the third section of the bracket is non-linear.

In a further non-limiting embodiment of any of the foregoing battery packs, the array frame is a plastic structure and the mounting insert is a metallic structure.

In a further non-limiting embodiment of any of the foregoing battery packs, the mounting insert is positioned within a through-hole of the fastener housing.

In a further non-limiting embodiment of any of the foregoing battery packs, the array frame includes a top wall, a bottom wall, and frame arms that extend between the top wall and the bottom wall.

In a further non-limiting embodiment of any of the foregoing battery packs, the fastener housing is formed at a junction between the top wall and one of the frame arms.

In a further non-limiting embodiment of any of the foregoing battery packs, a fastener extends through a bracket of the mounting insert.

In a further non-limiting embodiment of any of the foregoing battery packs, the fastener extends through an opening of the bracket and into a battery pack enclosure structure.

In a further non-limiting embodiment of any of the foregoing battery packs, the battery pack enclosure structure is a cross member disposed inside an enclosure assembly of the battery pack.

A method according to another exemplary aspect of the present disclosure includes, among other things, positioning a mounting insert within an array frame of a battery assembly, inserting a column bolt through the mounting insert, and securing the battery assembly to a battery pack enclosure structure using the mounting insert.

In a further non-limiting embodiment of the foregoing method, positioning the mounting insert included inserting the mounting insert within a through-hole of a fastener housing of the array frame.

In a further non-limiting embodiment of either of the foregoing methods, a sleeve of the mounting insert is received within the through-hole and a bracket of the mounting insert extends outwardly from the sleeve through a slot formed in the fastener housing.

In a further non-limiting embodiment of any of the foregoing methods, inserting the column bolt includes positioning the column bolt through a bore of a sleeve of the mounting insert.

In a further non-limiting embodiment of any of the foregoing methods, securing the battery assembly includes inserting a fastener through the mounting insert and into the battery pack enclosure structure.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes an array frame, a mounting insert positioned within the array frame, and a column bolt received through the mounting insert. The array frame may be mounted to a battery pack enclosure structure using the mounting insert. These and other features are discussed in greater detail in the following paragraphs of this detailed description.

Figure 1:
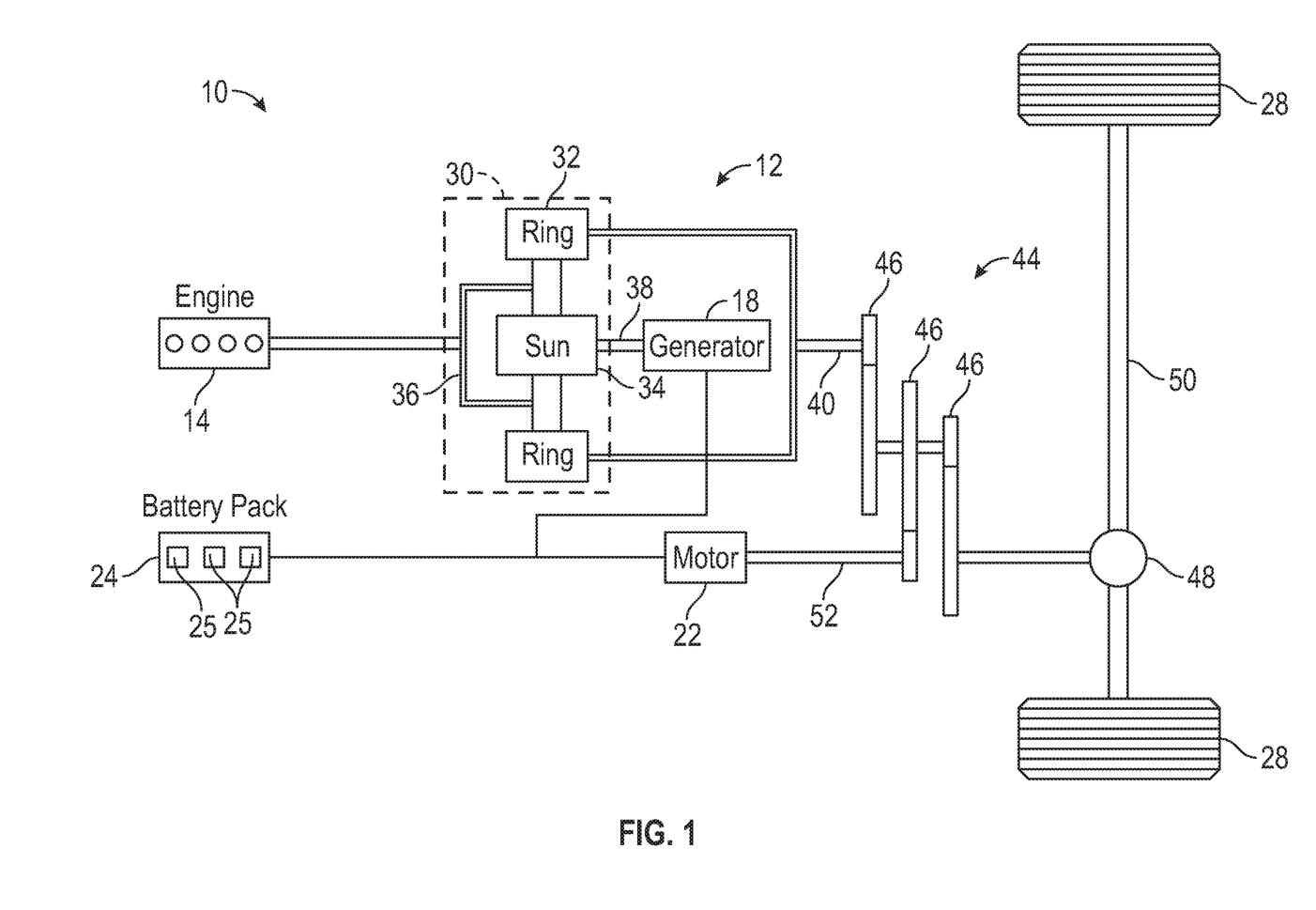
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
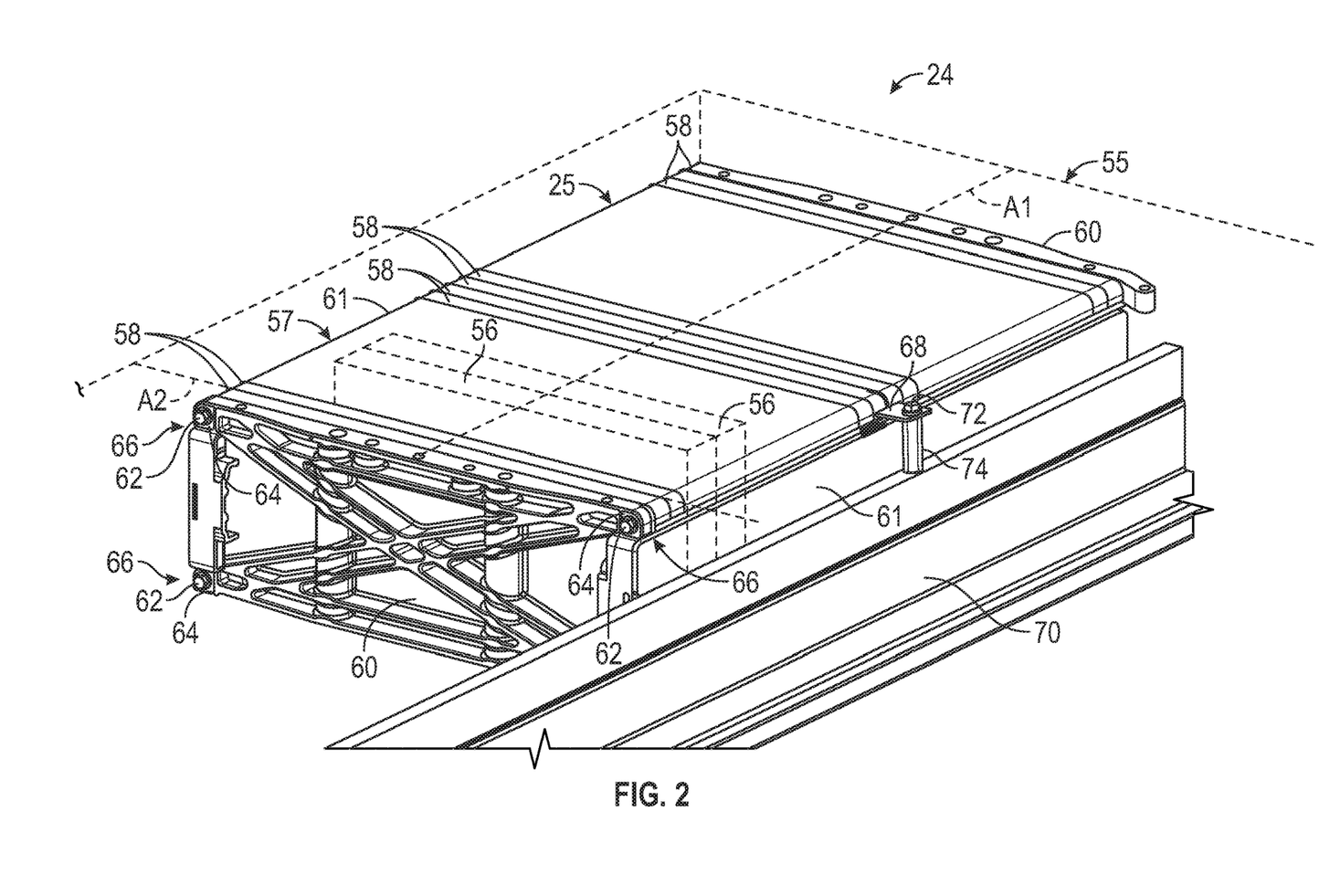
FIG. 2 illustrates select portions of a battery pack for an electrified vehicle.

FIG. 2 schematically illustrates a battery pack 24 that can be employed within an electrified vehicle. For example, the battery pack 24 could be part of the powertrain 10 of the electrified vehicle 12 of FIG. 1. FIG. 2 is a perspective view of the battery pack 24, and some external components (e.g., enclosure assembly 55) are shown in phantom to better illustrate the internal components of the battery pack 24.

The battery pack 24 houses a plurality of battery cells 56 that store energy for powering various electrical loads of the electrified vehicle 12. The battery pack 24 could employ any number of battery cells within the scope of this disclosure, and this disclosure is not limited to the exact configuration shown in FIG. 2.

The battery cells 56 may be stacked side-by-side to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery assembly 25. Although the battery pack 24 of FIG. 2 is depicted as having a single battery assembly 25, the battery pack 24 could include a greater number of battery assemblies within the scope of this disclosure.

An enclosure assembly 55 houses each battery assembly 25 of the battery pack 24. In a non-limiting embodiment, the enclosure assembly 55 is a sealed enclosure that includes a tray and a cover that is secured to the tray to enclose and seal each battery assembly 25 of the battery pack 24. The enclosure assembly 55 may include any size, shape, and configuration within the scope of this disclosure.

In an embodiment, the battery cells 56 of the battery assembly 25 are supported, held, and/or retained together by a support structure 57 disposed around an outer perimeter of the cell stack. The support structure 57 may include a plurality of interconnected array frames 58, opposing end plates 60, and opposing side plates 61. The array frames 58 are stacked side-by-side, assembled together, and positioned between the opposing end plates 60, which are positioned at the longitudinal extents of the battery assembly 25, and between the opposing side plates 61, which extend between the opposing end plates 60. Therefore, the battery assembly 25 extends along a longitudinal axis A1 between the opposing end plates 60. The array frames 58 each extend along a longitudinal axis A2 that is generally transverse to the longitudinal axis A1.

The support structure 57 may additionally include one or more column bolts 62 for axially constraining the battery assembly 25. In an embodiment, the support structure 57 includes four column bolts 62 that extend longitudinally between the opposing end plates 60, with one column bolt 62 positioned at the top and bottom of each side of the battery assembly 25. However, a greater or fewer number of column bolts could be employed by the battery assembly 25 within the scope of this disclosure. The column bolts 62 may generally extend in parallel with the longitudinal axis A1 of the battery assembly 25. In another embodiment, the column bolts 62 extend through openings 64 formed near each corner 66 of the end plates 60.

The column bolts 62 are connectable to each array frame 58 of the battery assembly 25. The column bolts 62 lock the positioning of the array frames 58 relative to one another to assemble the battery assembly 25 as a homogenous unit.

Figure 3:
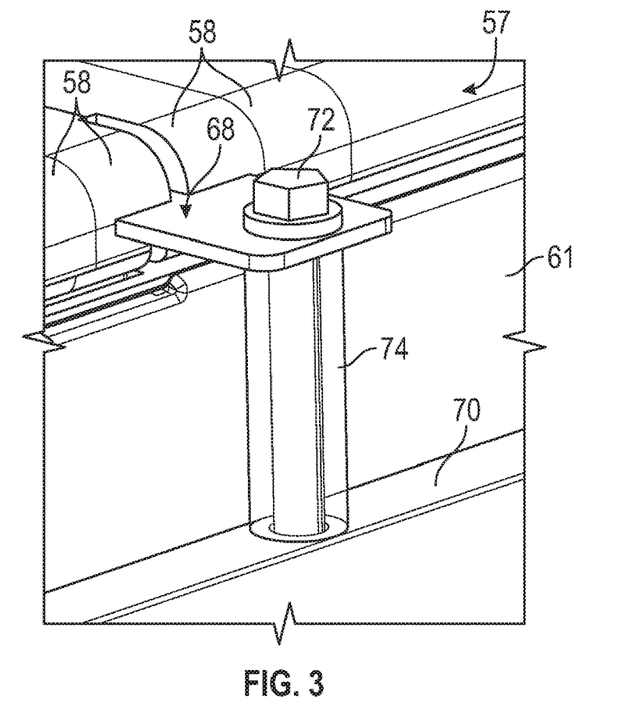
FIG. 3 is a blown up view of a portion of the battery pack of FIG. 2.

Referring to FIGS. 2 and 3, the support structure 57 may additionally include one or more mounting inserts 68 for mounting the battery assembly 25 to a battery pack enclosure structure 70 inside the battery pack 24. The battery pack enclosure structure 70 may be any component of the battery pack 24. In an embodiment, the battery pack enclosure structure 70 is part of the enclosure assembly 55. In another embodiment, the battery pack enclosure structure 70 is a cross member disposed inside the battery pack 24 for separating the battery assembly 25 from other battery assemblies of the battery pack 24.

The mounting insert 68 is positioned within one or more of the array frames 58. The column bolt 62 extends through the array frames 58 and through the mounting insert 68 once the mounting insert 68 is positioned within the array frames 58. The mounting insert 68 protrudes laterally outwardly in a direction away from the side plate 61 of the support structure 57 to a position above the battery pack enclosure structure 70. A fastener 72, such as a threaded fastener, may be inserted through the mounting insert 68 and into the battery pack enclosure structure 70 to mount the battery assembly 25 to the battery pack enclosure structure 70. The fastener 72 may extend through a sleeve 74 positioned between the mounting insert 68 and the battery pack enclosure structure 70 to stabilize the connection between the battery assembly 25 and the battery pack enclosure structure 70.

Figure 4:
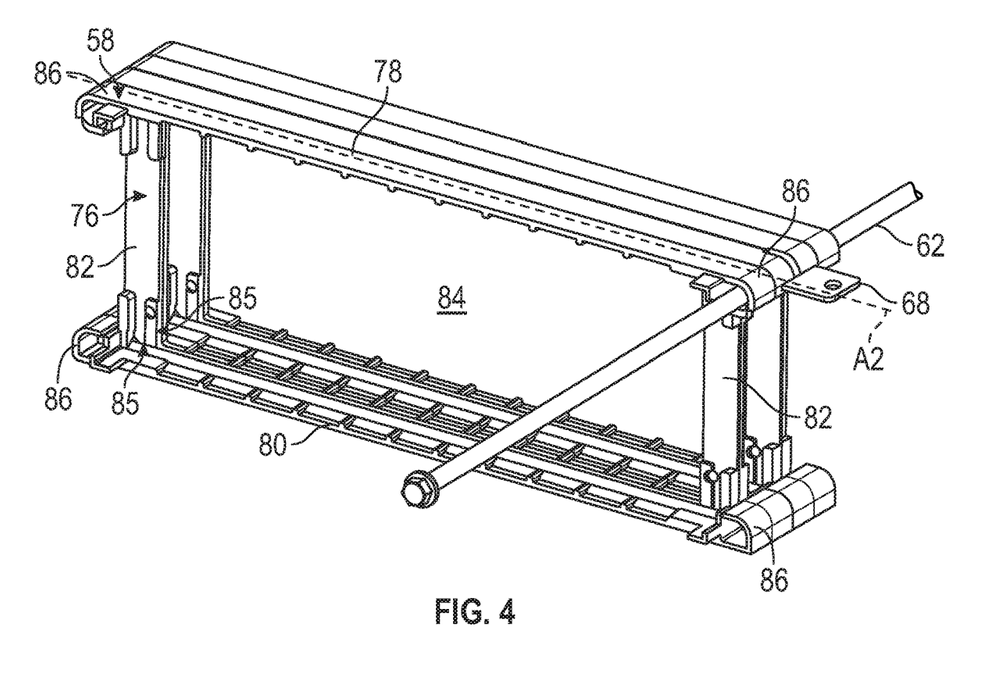
FIG. 4 is a perspective view of interconnected array frames of a battery assembly.

FIG. 4 illustrates a plurality of interconnected array frames 58 of the battery assembly 25 of FIG. 2. The array frames 58 of FIG. 4 are shown with the battery cells 56, the end plates 60, and the side plates 61 removed to better illustrate their various features.

Each array frame 58 includes a frame body 76 disposed along the longitudinal axis A2. The frame body 76 may be rectangular shaped (i.e., four sided) and includes a top wall 78, a bottom wall 80, and frame arms 82 that connect between the top wall 78 and the bottom wall 80. In an embodiment, the frame arms 82 are disposed near opposing ends (i.e., near the longitudinal extents) of the top wall 78 and the bottom wall 80. The top wall 78, the bottom wall 80, and the frame arms 82 establish a perimeter around an opening 84 formed through the frame body 76. In an embodiment, the top wall 78 and the bottom wall 80 extend horizontally and in parallel with the longitudinal axis A2 of the frame body 76, and the frame arms 82 extend vertically and transverse to the longitudinal axis A2. When mounted within the battery pack 24, the bottom wall 80 establishes a portion of a base of the battery assembly 25, and the top wall 78 establishes an upper surface of the battery assembly 25.

The frame body 76 of the array frame 58 may be a unitary, plastic structure. In an embodiment, the top wall 78, the bottom wall 80, and the frame arms 82 are molded, cast, machined or otherwise manufactured to form the unitary, monolithic structure.

Each opposing side of the frame body 76 may establish a pocket 85 that is sized and shaped to receive a battery cell. Each array frame 58 may house either one or two battery cells, with each pocket 85 capable of receiving a single battery cell 56.

The array frames 58 may additionally include one or more fastener housings 86 for accommodating the column bolts 62 and the mounting inserts 68 of the support structure 57. The fastener housings 86 are integrated features of the frame body 76 of the array frame 58. The fastener housings 86 may protrude from the frame arms 82 in a direction away from the opening 84 of the frame body 76. In an embodiment, the fastener housings 86 are disposed at both ends of the frame arms 82 (e.g., near the junction between each frame arm 82 and the top wall 78 and near the junction between each frame arms 82 and the bottom wall 80). In another embodiment, the fastener housings 86 are only provided near the junction between each frame arm 82 and the top wall 78.

Figure 5:
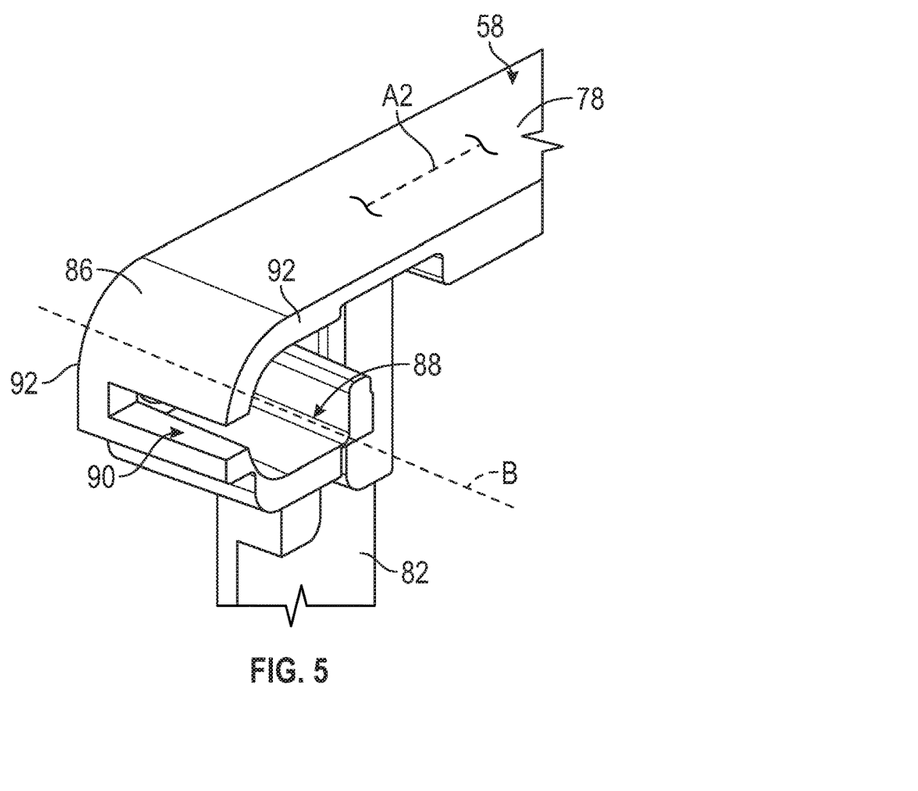
FIG. 5 illustrates select portions of one of the interconnected array frames of FIG. 4.

As best illustrated in FIG. 5, each fastener housing 86 includes a through-hole 88 and a slot 90. The through-hole 88 extends through the fastener housing 86. For example, the through-hole 88 may extend along an axis B between opposing end walls 92 of the fastener housing 86. In an embodiment, the axis B is perpendicular to the longitudinal axis A2 of the array frame 58 and thus extends parallel to the longitudinal axis A1 of the battery assembly 25. The slot 90 extends partially through the fastener housing 86. For example, the slot 90 may extend from one of the opposing end walls 92 toward the other of the opposing end walls 92 but terminates prior to reaching the other of the opposing end walls 92. In an embodiment, the slot 90 opens into the through-hole 88.

As discussed in greater detail below, the mounting inserts 68 can be positioned within the through-holes 88 and the slots 90 of the fastener housings 68 of the array frames 58, and the column bolts 62 can then be passed through the through-holes 88 of the array frames 58 and through the mounting inserts 68. The column bolts 62 function to impart compression across the battery assembly 25.

Additional features of the exemplary mounting insert 68 are illustrated with reference to FIG. 6 (with continued reference to FIGS. 4 and 5). The mounting insert 68 may include a sleeve 94 and a bracket 96 that extends from the sleeve 94. The sleeve 94 is sized and shaped to be positioned within the through-hole 88 of the fastener housing 86 of the array frame 58, and the bracket 96 is sized and shaped to extend through the slot 90 of the fastener housing 86. In an embodiment, the sleeve 94 is cylindrical shaped and includes a bore 98 for receiving one of the column bolts 62. In another embodiment, the bracket 96 is a substantially flat flange that protrudes away from an outer surface of the sleeve 94. The bracket 96 may include an opening 99 for receiving a fastener (see, e.g., fastener 72 of FIG. 3).

The mounting insert 68 may be a unitary, metallic structure. In an embodiment, the mounting insert 68 is made of aluminum. However, other metallic materials are also contemplated within the scope of this disclosure.

Figure 7A:
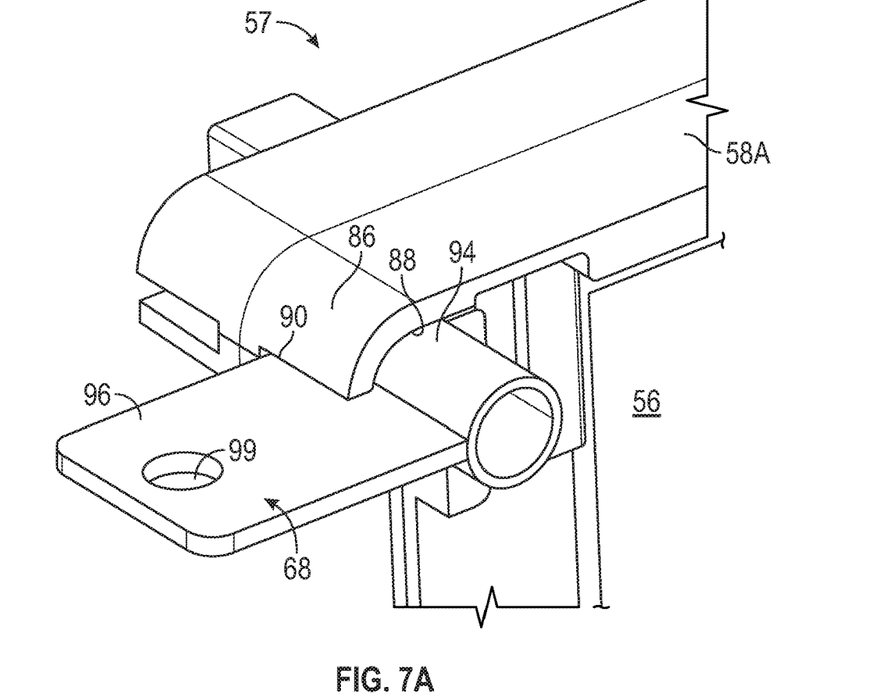
FIGS. 7A, 7B, and 7C schematically illustrate a positioning of the mounting insert of FIG. 6 within a plurality of interconnected array frames of a battery assembly.
Figure 7B:
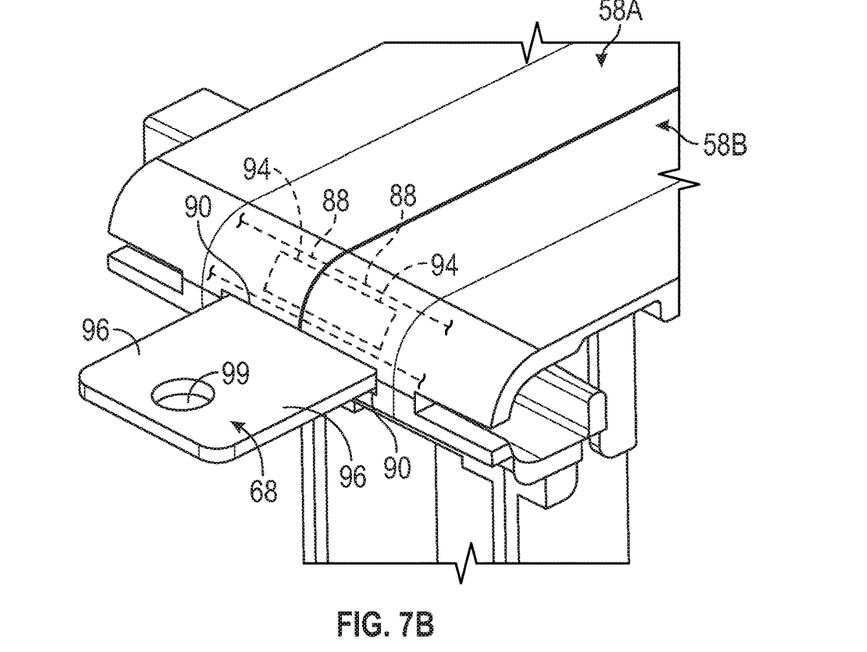
Figure 7C:
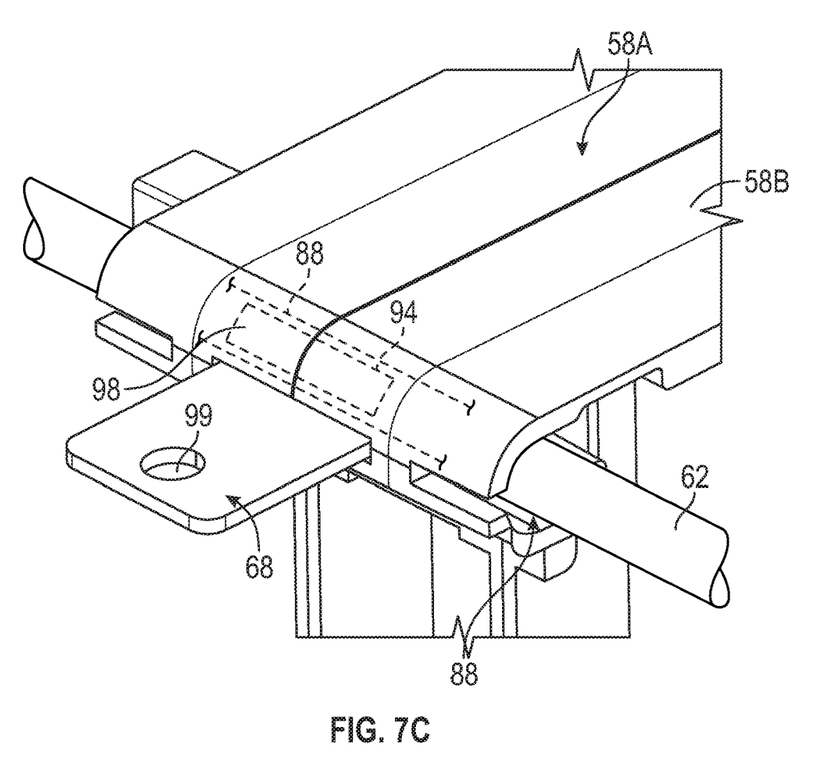

FIGS. 7A to 7C schematically illustrate an exemplary method for assembling portions of the support structure 57 of the battery assembly 25. Referring first to FIG. 7A, the mounting insert 68 may be positioned within the fastener housing 86 of a first array frame 58A. When inserted, the sleeve 94 of the mounting insert 68 is positioned within the through-hole 88 of the fastener housing 86 such that the bore 98 is coaxial with the through-hole 88, and the bracket 96 of the mounting insert 86 extends through the slot 90 of the fastener housing 86. The bracket 96 extends in a direction away from the battery cells 56.

Next, as shown in FIG. 7B, a second array frame 58B can be connected to the first array frame 58A. The second array frame 58B can be connected to the first array frame 58A in any known manner Once connected, the sleeve 94 of the mounting insert 68 is positioned within the through-hole 88 of the fastener housing 86 of the second array frame 58B, and the bracket 96 of the mounting insert 68 extends through the slot 90 of the fastener housing 86 of the second array frame 58B. In an embodiment, the slots 90 of the fastener housings 86 of the first array frame 58A and the second array frame 58B cooperate to establish a larger slot that accommodates the bracket 96. Additional array frames 58 can be added to the assembly to construct the battery assembly 25.

Finally, as depicted by FIG. 7C, the column bolt 62 may next be inserted through the through-holes 88 of the fastener housings 86. The column bolt 62 also passes through the bore 98 of the sleeve 94 of the mounting insert 68. In this way, the interconnection of the column bolts 62 and the fastener housings 86 is leveraged to provide the additional function of connecting the mounting inserts 68.

Once the battery assembly 25 is assembled and positioned within the enclosure assembly 55, a fastener 72 may be inserted through the opening 99 of the bracket 96 of the mounting insert 68 to mount the battery assembly 25 to the battery pack enclosure structure 70 (see, e.g., FIG. 3). Although only a single mounting insert 68 is depicted in FIGS. 3 and 7A to 7C, one or more mounting inserts 68 can be utilized to mount the battery assembly 25 to the battery pack enclosure structure 70.

Figure 8:
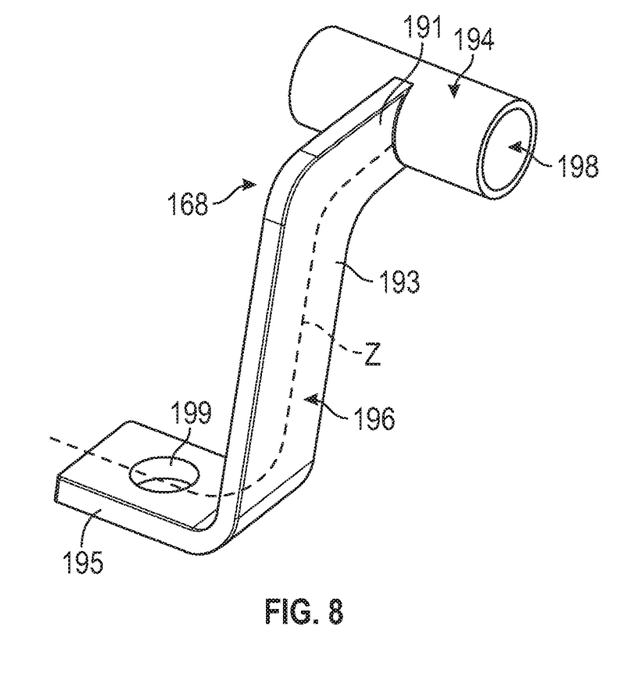
FIG. 8 illustrates another exemplary mounting insert for mounting a battery assembly within a battery pack.

FIG. 8 illustrates another exemplary mounting insert 168 for mounting a battery assembly to a battery pack enclosure structure. The mounting insert 168 may include a sleeve 194 and a bracket 196 that extends from the sleeve 194. The sleeve 194 is sized and shaped to be positioned within the through-hole 88 of the fastener housing 86 of the array frame 58, and the bracket 196 is sized and shaped to extend through the slot 190 of the fastener housing 86. In an embodiment, the sleeve 194 is cylindrical shaped and includes a bore 198 for receiving one of the column bolts 62.

In another embodiment, the bracket 196 includes a first section 191 that protrudes in a first direction laterally away from an outer surface of the sleeve 194, a second section 193 that protrudes in a second direction vertically away from the first section 191, and a third section 195 that protrudes in a third direction laterally away from the second section 193. An axis Z that extends through the first section 191, the second section 193, and the third section 195 may be non-linear. The directions and distances that the sections 191, 193, and 195 of the bracket 196 extend relative to one another can vary and is dependent on the location of the battery pack enclosure structure, among other design criteria.

The mounting insert 168 is configured for mounting a battery array 25 to a battery pack enclosure structure 170 where a relatively large distance extends between the sleeve 194 of the mounting insert 168 and the battery pack enclosure structure 170. The third section 195 of the bracket 196, which is vertically offset from the sleeve 194, may include an opening 199 for receiving a fastener 172 for mounting the battery assembly 25 to the battery pack enclosure structure 170 (see, e.g., FIG. 10).

Figure 9A:
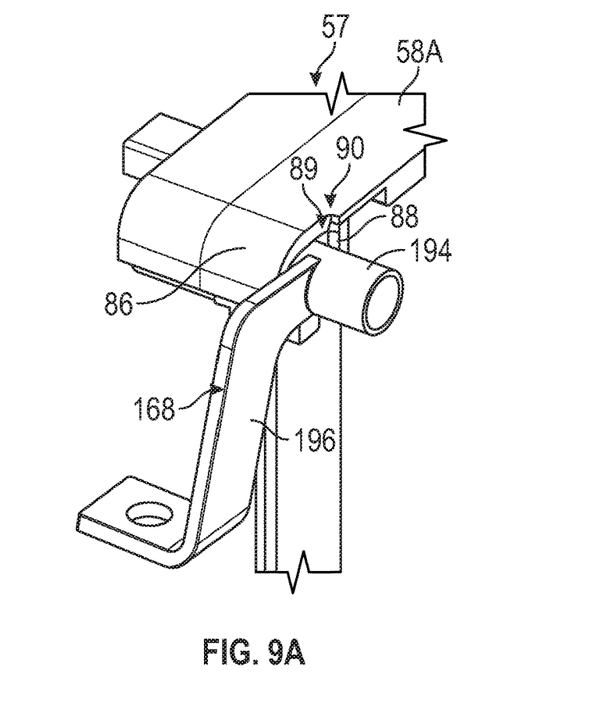
FIGS. 9A, 9B, and 9C schematically illustrate a positioning of the mounting insert of FIG. 8 within a plurality of interconnected array frames of a battery assembly.

FIGS. 9A, 9B, 9C, and 10 schematically illustrate an exemplary method for assembling portions of the support structure 57 of the battery assembly 25 using the mounting inserts 168. Referring first to FIG. 9A, the mounting insert 168 may be positioned within the fastener housing 86 of a first array frame 58A. When inserted, the sleeve 194 of the mounting insert 168 is positioned within the through-hole 88 of the fastener housing 86, and the bracket 196 of the mounting insert 168 extends through the slot 90 of the fastener housing 86. In this embodiment, the slot 90 is established by notches 89 formed in the fastener housings 86 of adjacent array frames 58A, 58B.

Figure 9B:
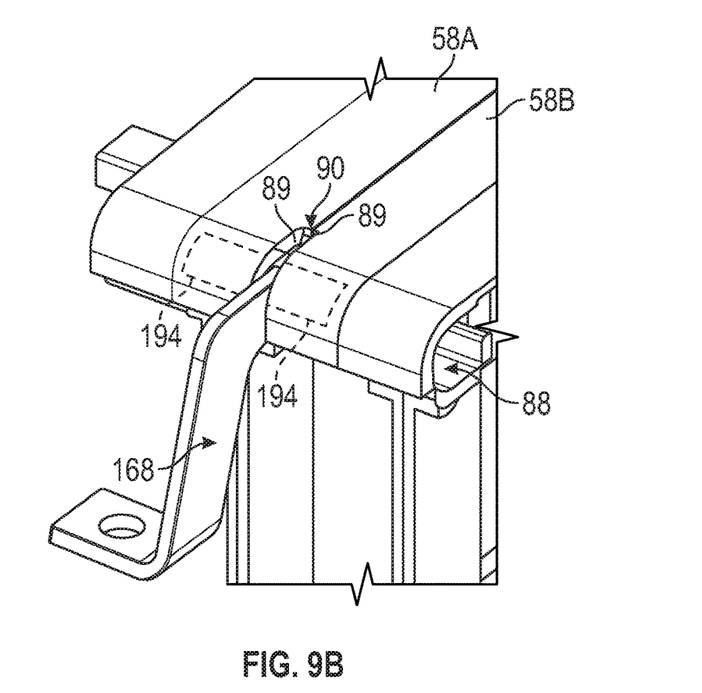
Figure 9C:
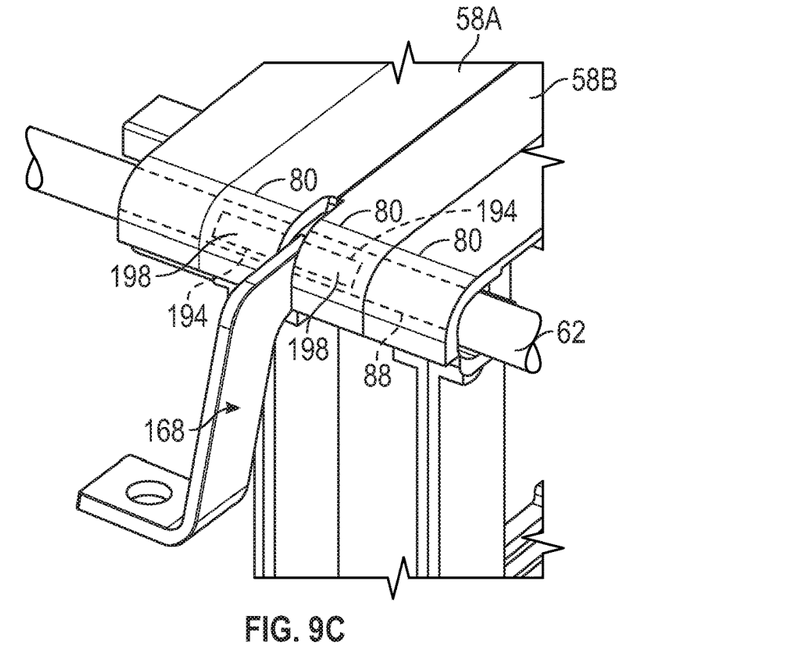

Next, as shown in FIG. 9B, a second array frame 58B can be connected to the first array frame 58A. Once connected, the sleeve 194 of the mounting insert 168 is positioned within the through-hole 88 of the fastener housing 86 of the second array frame 58B and the bracket 196 of the mounting insert 168 extends through the slot 90 established by the notches 89 of the first and second array frames 58A, 58B. Additional array frames 58 can be added to the assembly to construct the battery assembly 25.

Finally, as depicted by FIG. 7C, the column bolt 62 may be inserted through the through-holes 88 of the fastener housings 86. The column bolt 62 passes through the bore 198 of the sleeve 194 of the mounting insert 168. In this way, the interconnection between the column bolts 62 and fastener housings 86 is leveraged to provide the additional function of connecting the mounting inserts 168.

Figure 10:
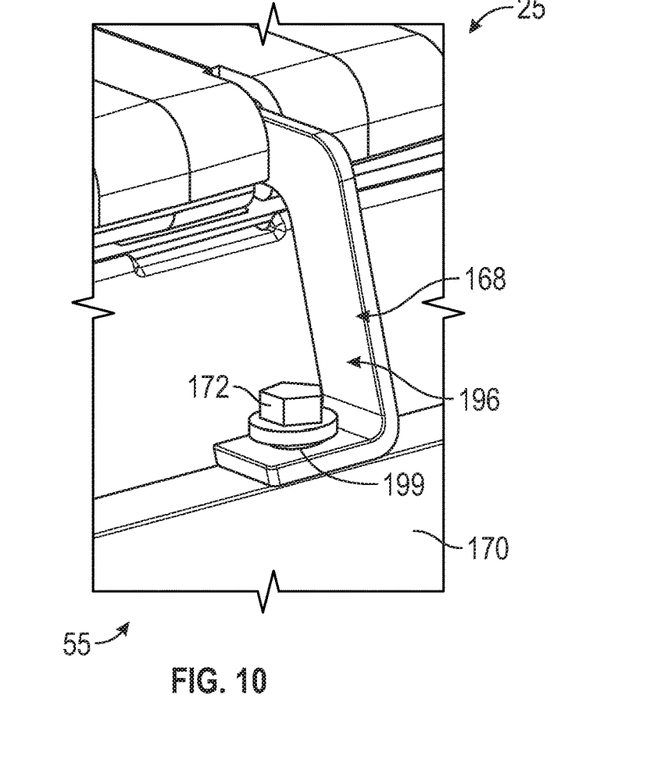
FIG. 10 illustrates a battery assembly mounted within a battery pack using the mounting insert of FIG. 8.

Referring now to FIG. 10, once the battery assembly 25 is assembled and positioned within the enclosure assembly 55, a fastener 172 may be inserted through the opening 199 of the bracket 196 of the mounting insert 168 to mount the battery assembly 25 to the battery pack enclosure structure 170. Although only a single mounting insert 168 is depicted, one or more mounting inserts 168 can be utilized to mount the battery assembly 25 to the battery pack enclosure structure 170.

Figure 6:
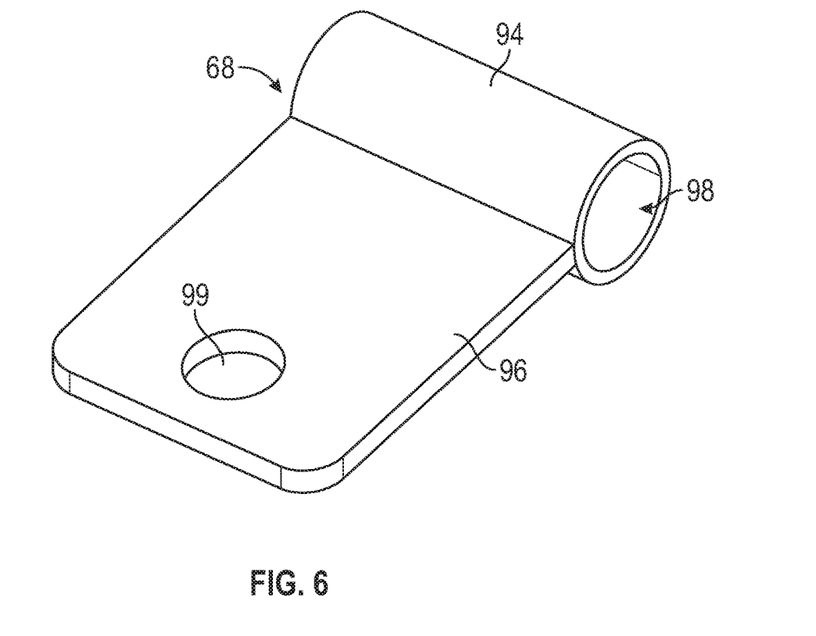
FIG. 6 illustrates an exemplary mounting insert for mounting a battery assembly within a battery pack.

In another embodiment, a mixture of both the mounting insert 68 of FIG. 6 and the mounting insert 168 of FIG. 8 can be used to mount the battery assembly 25.

The battery pack designs of this disclosure leverage the column bolts of each battery assembly to integrate a mounting insert for mounting the battery assemblies to battery pack enclosure structures. The proposed designs eliminate the need for separate brackets for securing the battery assemblies, thereby reducing parts, costs, and assembly times. In addition, the mounting inserts reduce packaging challenges by reducing dimensional variations within each cell stack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    a first plastic array frame including a first fastener housing;
    a first battery cell held within the first plastic array frame;
    a second plastic array frame connected to the first plastic array frame and including a second fastener housing;
    a second battery cell held within the second plastic array frame,
    wherein the first fastener housing and the second fastener housing align to establish a through-hole;
    a metallic mounting insert including a first portion received within the through-hole and a second portion that extends outwardly from the first portion and through a first slot of the first plastic array frame and a second slot of the second plastic array frame;
    a column bolt that extends through a bore of the first portion of the metallic mounting insert;
    a fastener that extends through an opening of the second portion of the metallic mounting insert; and
    a battery pack enclosure structure that receives the fastener to secure the first and second plastic array frames relative to the battery pack enclosure structure.

2. The battery pack as recited in claim 1, wherein the first portion of the metallic mounting insert includes a sleeve and the second portion of the metallic mounting insert includes a bracket that extends from the sleeve.

3. The battery pack as recited in claim 2, wherein the column bolt extends through the bore of the sleeve of the metallic mounting insert.

4. The battery pack as recited in claim 2, wherein the bracket extends through the first slot and the second slot.

5. The battery pack as recited in claim 2, wherein the bracket is a substantially flat flange that protrudes laterally away from an outer surface of the sleeve.

6. The battery pack as recited in claim 2, wherein the bracket includes a first section that extends in a first direction from the sleeve, a second section that extends in a second direction from the first section, and a third section that extends in a third direction from the second section.

7. The battery pack as recited in claim 6, wherein an axis through the first section, the second section, and the third section of the bracket is non-linear.

8. The battery pack as recited in claim 1, wherein the first plastic array frame includes a top wall, a bottom wall, and frame arms that extend between the top wall and the bottom wall.

9. The battery pack as recited in claim 8, wherein the first fastener housing is formed at a junction between the top wall and one of the frame arms.

10. The battery pack as recited in claim 1, wherein the battery pack enclosure structure is a cross member disposed inside an enclosure assembly of the battery pack.

11. The battery pack as recited in claim 1, wherein the metallic mounting insert is a unitary, metallic structure that is a separate structure from the first plastic array frame and the second plastic array frame.

12. The battery pack as recited in claim 1, wherein the fastener extends through a sleeve that is positioned between the metallic mounting insert and the battery pack enclosure structure.

13. The battery pack as recited in claim 1, comprising a second metallic mounting insert received within a third fastener housing of a hird plastic array frame, wherein the second metallic mounting insert includes a different configuration than the metallic mounting insert.

* * * * *

UNITED STATES PATENT AND TRADEMARK OFFICE
CERTIFICATE OF CORRECTION

PATENT NO. : 10,720,619 B2
APPLICATION NO. : 15/784459
DATED : July 21, 2020
INVENTOR(S) : Mladen Marjanovic et al.

Page 1 of 1

It is certified that error appears in the above-identified patent and that said Letters Patent is hereby corrected as shown below:

In the Claims

In Claim 13, Column 10, Line 52; replace "of a hird plastic" with --of a third plastic--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*